(12) United States Patent
Serhan

(10) Patent No.: US 11,397,909 B2
(45) Date of Patent: Jul. 26, 2022

(54) LONG TERM SENSOR MONITORING FOR REMOTE ASSETS

(71) Applicant: Tattle Systems Technology Inc., Saskatoon, CA (US)

(72) Inventor: Aaron Serhan, Hudson Bay (CA)

(73) Assignee: TATTLE SYSTEMS TECHNOLOGY INC., Saskatoon (CA)

(*) Notice: Subject to any disclaimer, the term of this patent is extended or adjusted under 35 U.S.C. 154(b) by 618 days.

(21) Appl. No.: 16/460,574

(22) Filed: Jul. 2, 2019

(65) Prior Publication Data

US 2021/0004757 A1 Jan. 7, 2021

(51) Int. Cl.
*G06Q 10/08* (2012.01)
*H04L 67/12* (2022.01)
*H04W 4/35* (2018.01)
*H04L 43/106* (2022.01)
*H04W 4/029* (2018.01)

(52) U.S. Cl.
CPC ...... *G06Q 10/0833* (2013.01); *G06Q 10/0832* (2013.01); *H04L 43/106* (2013.01); *H04L 67/12* (2013.01); *H04W 4/029* (2018.02); *H04W 4/35* (2018.02)

(58) Field of Classification Search
CPC ...... H04W 4/029; H04W 4/35; H04L 43/106; H04L 67/12; G06Q 10/0832; G06Q 10/0833
USPC ........................................................ 370/230
See application file for complete search history.

(56) References Cited

U.S. PATENT DOCUMENTS

| | | | | |
|---|---|---|---|---|
| 8,098,590 B2* | 1/2012 | Catovic | ................. | H04W 24/08 455/67.11 |
| 10,079,898 B2* | 9/2018 | Lau | ......................... | H04L 67/12 |
| 10,242,497 B2* | 3/2019 | Freeman | ................. | G06F 30/13 |
| 2010/0131533 A1* | 5/2010 | Ortiz | ....................... | G06F 16/51 707/758 |
| 2016/0189752 A1* | 6/2016 | Galant | ................... | H04N 5/772 386/224 |
| 2017/0324951 A1* | 11/2017 | Raveendran | ......... | H04N 13/344 |
| 2018/0270612 A1* | 9/2018 | Thoresen | .................. | G01S 1/02 |
| 2019/0289172 A1* | 9/2019 | Bangs | .................. | H04N 13/243 |
| 2020/0207298 A1* | 7/2020 | Wensley | ............... | B60H 1/008 |

* cited by examiner

*Primary Examiner* — Christopher M Crutchfield
*Assistant Examiner* — Jean F Voltaire
(74) *Attorney, Agent, or Firm* — Suiter Swantz pc llo

(57) ABSTRACT

A method of tracking remotely captured sensor readings in relation to mobile or stationary assets. Remote assets with local sensors are associated with sensor interface device capable of capturing local sensor readings along with geolocation and timestamps, and transmitting such information via a network interface to a server for storage in a sensor record database. A user in communication with the server can indicate a sample request, via which a subset of sensor records for a particular time window is extracted and the sensor readings and geolocations displayed to the user. The information could be presented in graphic map format. The sensor interface device has a self-contained power supply not requiring power input, allowing for long term remote field use. The server and sensor interface device for use in association with the method is also disclosed.

20 Claims, 8 Drawing Sheets

LONG TERM SENSOR MONITORING FOR REMOTE ASSETS

FIELD OF THE INVENTION

This invention is in the field of remote sensor monitoring and more particularly presents hardware and methodology for the remote capture of local sensor values in relation to remote stationary or mobile assets and central storage and geographic- and time-referenced extraction and reporting thereof.

BACKGROUND

Many industries including agriculture, petrochemical production and the like, just to name a few, have seen increases in the remote staging of stored inputs—liquid and dry supplies and the like are in more cases than ever desired to be stored in close proximity to their locations of use. As those locations become more distributed however, it is desirable to be able to optimize the delivery schedules to those locations to minimize cost. In order to optimize delivery schedules to such locations, it is necessary to be able to monitor the state or storage level of different products stored at such locations, so that the timing for the necessity of deliveries to replenish supplies can be properly calculated and deliveries schedule. Just-in-time delivery and pickup schedules require the best data possible, which becomes harder to monitor and to obtain as the logistic lines are geographically extended further and further. To avoid the need for humans to attend and manually capture these readings that particular storage or operation sites it would be desirable to come up with a reliable remote sensing technology which can be used to quickly and efficiently monitor available storage or available product at particular locations.

Similarly in extractive industries, the storage of extracted products such as oil or gas with the like which needs to eventually be transported—for example in the case of oil wells that are not connected to pipelines or the like—the extracted output also needs to be stored in a way that can be monitored for optimized pickup schedules. For example the collection of crude oil extracted from various oil wells and stored on site or in proximity to the wells in staging tanks until tankers can be used to pick up product and transported to a pipeline or to an aggregation point. Again, to optimize the pickup schedules for these products, it would be desirable to have access to automated remote sensing technology which did not require human attendance to settle the contents of storage tanks, storage bins and the like to determine the level of storage of the level of available storage remaining in a particular tank, bin or location.

Many existing storage bins, storage tanks and other similar operating environments include pre-existing sensors which are capable of capturing the necessary information but the information is not captured on the sensor unit which can communicate over long distances to avoid the need for significant manual attendance to either capture the sensor information or to regularly maintain, charge or otherwise attend to the sensor equipment. If it were possible to come up with a long ring sensor technology which could address some of the current shortcomings in the industry for just-in-time sensor information for scheduled pickup or delivery in such commercial applications, using a piece of technology that could be retrofitted to pre-existing sensors contained within storage bins, storage tanks and the like, it is felt that this would accelerate further the commercial adoption of such technology.

A further shortcoming of current sensor technologies which it is desired to overcome to assist in this just-in-time logistics category is the desire for the use of remote sensing technology on mobile containers—for example to be able to sample available capacity or available product in a moving container such as a trailer or train car or the like. This has heretofore been difficult since typical remote sensing technologies require tethered power supplies, tattered network bandwidth for communication and the like. If it was possible to produce a remote-sensing unit that could communicate over long distances without the need for tethered network conductivity or tethered power, this would be commercially valuable.

One of the shortcomings of different types of equipment which may have been conceived for use to date in remote monitoring applications is the fact that the equipment typically requires a consistent power supply. Requiring ongoing access to a consistent power supply typically limits the ability to use remote sensing to stationary applications in which there is ongoing fixed power, or ongoing engine operations of the lake providing the ability to power the remote sensor without depleting the available power supply etc. If it were possible to provide remote sensing equipment which allowed for the removal of a significant ongoing available power supply and to untethered remote monitoring equipment from fixed location power supplies, the types of locations in which remote sensing could be used would be significantly improved and enhanced and it is believed this would be significant from a commercial adoption perspective.

If it were possible to facilitate mobile general sensor technologies which would allow for the sampling of the remote capacity or remote contents of particular containers such as tanks, storage bins and the like, many types of software or business methodologies could be built upon such data. For example, if it were possible to build a data system which encompassed remote sensor readings which could display the remote sensor readings captured from mobile remote sensors in a mapped format, such that data points captured within a particular timeframe could be geographically viewed, this would be useful in some applications. Also, some users may wish to graphically view sensor readings in respect of more than one sensor or more than one storage location at the same time, for the purpose of planning those optimized delivery schedules the status, and if it were possible to provide such a dataset and data tool is again believed that this would be a significant commercial development which would be valuable in industry.

Remote-sensing technology such as contemplated for level sensing outlined above would also be useful with other types of sensors including temperature sensors or really any other type of a active or passive sensor which it was desired to sample or capture from a long distance.

SUMMARY OF THE INVENTION

As outlined herein, the present invention comprises a method of monitoring local sensors associated with remote assets. Each monitored asset has an associated sensor interface device connected to it. The key components of the sensor interface device associated with each monitored asset are a processor, memory and a wide area network interface, a geolocation device capable of capturing the geolocation of the sensor interface device at any given time, and a sensor bus capable of connection to and reading from at least one local sensor. A sensor software component is capable of initiating sampling of the attached sensors and completing periodic sensor data capture transmissions via the network interface to a server. The sensor bus might be a bus allowing for the connection of pre-existing or third-party local sensors in relation to the remote asset, or in other embodiments of a sensor interface device in accordance with the remainder of the present invention the at least one local sensor might be integrated or directly connected by the sensor bus to the remainder of the sensor interface device.

The sensor interface device also includes a power supply that does not require external charging or power input on an ongoing basis, thus allowing for long-term remote and mobile deployment of the sensor interface device in the field. It is specifically contemplated that the power supply might comprise an integrated solar panel and battery system, or it could comprise many other types of power supplies and batteries all of which are contemplated within the scope of the present invention.

The sensor interface device associated with each remote asset to be monitored will be in network communications via its network interface with a server which is provided in the next step of the method. The method specifically contemplates monitoring local sensors associated with a plurality of remote assets. The remote assets could be located, stationary or mobile, anywhere that they were within network communication range via the integrated network interface of the sensor interface device with a server.

The server comprises a processor, a memory and a network interface capable of communication by at least one wide-area data network with at least one client device of a user as well as with the sensor interface device associated with each monitored asset. The network interface of the server might comprise a single network interface, or in other embodiments may comprise multiple network interfaces capable of communication with the necessary hardware.

In addition to the network interface, the server also comprises a database containing an asset data set comprising asset records corresponding to each monitored asset and its associated sensor interface device, and a sensor data set which comprises sensor records each corresponding to a sensor data capture in respect of a remote monitor asset. Each sensor record would correspond to a particular sensor data captured by a sensor interface device and would contain a link to a related asset record, the timestamp of the capture time of the sensor data capture being stored, the geolocation of the associated sensor interface device at the capture time, and captured sensor readings for each active local sensor attached via the sensor bus to the associated sensor interface device at the capture time.

In addition to the database comprising information related to the remote assets being monitored and the sensor readings being captured from the associated sensor interface device, the server also comprises a monitoring software component for carrying out the steps of the method. Many different approaches to the specifics of the design and creation of a monitoring software component will be understood to those skilled in the art of the latest software design and any type of a software component with the design and functionality to conduct the method outlined herein will all be contemplated and understood to be within the scope of the present invention.

The server and the monitoring software component will be used to conduct the steps of the method of the present invention. One function of the monitoring software component in conjunction with the remainder of the hardware and software components of the server is to maintain, during operation of the method, a monitoring loop whereby the network interface of the server is monitored for the receipt of sensor data capture transmissions which correspond to individual sensor data captures transmitted from related sensor interface device. Upon receipt of a sensor data capture transmission, the software and the server will process the contents of that transmission for storage of a sensor record within the database.

A sensor data capture transmission received by the server will contain data values including the identity of the sensor interface device, the timestamp of the capture time in respect of which the sensor data values relate, the geolocation of the sensor interface device at the capture time, and the captured sensor readings for each associated active local sensor of the associated sensor interface device at the capture time. In certain cases not all of the local sensors attached to the sensor bus of a particular sensor interface device in respect of a particular remote asset will be active, and only the active local sensors would be sensed, captured and their values transmitted to the server. Any number of different local sensors can be attached to the sensor interface device depending upon the scope and nature of the design of the sensor bus. Any type of sensor interface device and sensor bus accommodating one or more local sensors will be understood to all be contemplated within the scope of the present invention.

One of the keys to the method of the present invention is that the captured sensor readings for each active local sensor of the associated sensor interface device at a capture time will always be stored in conjunction with the timestamp of the capture time, as well as the geolocation of the sensor interface device at the capture time. This allows for time-based filtering of the related sensor records as well as the mapping of the sensor readings and the location of the sensor interface device at the appropriate capture times based on the captured geolocations. The geolocation is an important aspect of the data capture since it is explicitly contemplated that the sensor interface device used in conjunction with the remainder of the present invention insofar as it is self-contained and allows for remote operation could be attached to mobile remote assets to be monitored, such as tanks or particulate bins on trucks or the like, or while the sensor interface device could be mobile it could also be used in conjunction of the stationary asset with the geolocation still being captured and stored.

On receipt of a sensor data capture transmission at the network interface of the server, the monitoring software component would create a sensor record for storage in the database which contains the data values from the sensor data capture transmission and associated that sensor record with the related asset record of the sensor interface device identified in the transmission. It is contemplated and expected that the sensor interface device would typically be associated only with a single remote asset or location. The sensor records will include the geolocation of the sensor interface device at the time that the sensor readings were captured as well as a timestamp, so that the results requested in a sample request could be limited by time window and sorted and displayed at least chronologically and potentially as well by geolocation.

In addition to creating sensor records, the monitoring software component would also process the handling of sample requests at the server, which are requests from users of client devices for queries or reporting of information back from the database based on sensor readings captured at particular capture times. A user could initiate a sample request from an originating client device to the server—this could be a manually initiated request from the user, whereby they upon proper authentication in a communication session between the originating client device and the server requested the sampling of a report in respect of one or more monitored assets. The sample request would include the identity of one or more monitored assets that it was desired to query, as well as a specific sample time period. The sample time period would be the period of time within which relevant data captures and sensor records from the database were to be incorporated into the requested report.

On receipt of a sample request, the monitoring software component would upon validation of that request first conduct a data extraction step which comprises identifying the asset record or records corresponding to the remote assets subject of the sample request, which are the identified asset records. Following the identification of the identified asset record or records the monitoring software component would then select all of the sensor records from the database which corresponded to the identified asset record or records, and which were timestamped within the sample time period, which is the rendered records set. Based upon a user selection of particular monitored assets, contained within a sample request, the system would identify the sensor interface device on the backend which is associated with those remote assets and use that information to select any relevant sensor records for a desired time period from the database—this being the rendered records set. Finally, the transmission or display of the rendered records set would be facilitated by the monitoring software component, including at least the geolocation of the captured sensor readings for each record of the extracted record set, on the display of the originating client device. These will be sorted in order of the timestamps associated with the records in the extracted record set.

The sample time period could be a single particular point in time—ie. the extracted record set could only include a single sensor record in respect of each selected monitored asset identified in the sample request, or the sample time period could be a longer time frame which would effectively potentially result in multiple sensor records in the extracted record set resulting in the ability to display and graph for example declining or increasing sensor values over the sample time period. Both such approaches—i.e. a single sensor record for each monitored asset in the extracted record set or multiple sensor records in the extracted record set for each monitored asset and associated sensor interface device—are contemplated within the scope of the present invention.

The sensor interface device at a particular monitored asset could have one or more local sensors associated therewith, each of which could be hardwired or permanently attached to the sensor interface device or in other embodiments, the sensor bus of the sensor interface device could permit the interchangeable connection of various types of local sensors thereto. As well, combinations of permanently attached and interchangeable sensors could also be used in association with the sensor bus.

The local sensors in respect of a particular monitored asset could be liquid level sensors, particulate level sensors, temperature sensors or any number of different types of active or passive sensors capable of capturing a relevant remote sensor reading that was desired to be monitored in accordance with the mobile remote monitoring method of the present invention. The monitoring software component and specifically the components of the monitoring software component related to the handling of sample requests from client devices could allow for adaptation of the output of the results of an extracted record sent to the display or interface of a particular originating client device based upon the sensor types, volume of the container where the local sensors were level sensors, or other types of adaptations. Again, the ability to modify the software of the system of the present invention to accommodate these different types of sensors at one or more monitored assets will be understood to those skilled in the art and are all contemplated within the scope of the present invention.

The sensor software component of the sensor interface device itself could be responsible for originating sensor data capture transmissions to the server on a scheduled basis. The software could trigger the origination of a sensor data capture transmission on a predetermined time basis, or in any number of other different types of pre-programmed or predetermined frequencies or times. A sensor data capture transmission could also be originated by the sensor software component when a change in the levels or readings of the local sensors active and attached to the sensor interface device was determined. By only triggering a sensor data capture transmission when there was a sensor level change, network bandwidth consumed for the transmissions would be minimized. Any type of a locally triggered or locally scheduled sensor data capture transmission process is contemplated within the scope of the present invention.

In the alternative to a periodically scheduled or locally triggered sensor data capture transmission methodology, the method might alternatively involve two-way communication between the sensor interface device and the server, wherein the server could poll the sensor interface device to originate a sampling step and the creation and transmission of a subsequent sensor data capture transmission to the server. The server could trigger the polling and subsequent sampling step based upon a manual input from a user, a predetermined time frequency or any number of other types of testing frequencies or intervals that were desired and again any type of approach that would result in the ability of the server to trigger a sampling step at a particular sensor interface device associated with a monitored asset is contemplated within the scope of the present invention as well.

When the monitoring software component was facilitating the display of the results of a sample request to an interface of an originating client device, that could be done in a textbased format, showing a report that was produced on or via a user display interface of the originating client device including the geolocation and the captured sensor readings from any active local sensors at the particular one or more monitored remote locations or assets within the particular desired time window, or in other embodiments the monitoring software component could contain or interface with graphic mapping software such that the display of the rendered records sent to a graphical user interface of the originating client device would result in the display of a graphical map with the captured sensor readings graphically presented thereon in visual reference to the location stored as the geolocation in respect of each rendered sensor record. In further embodiments of the method of the present invention, rather than providing either graphical or a textbased display, the presentation of the results of a sample request to the interface of an originating client device could be the transmission of raw data results via a API or the like.

The local sensors which can be used in conjunction with the sensor interface device would be selected from at least the group of temperature sensors, liquid level sensors, dry level sensors or any other type of an active or passive sensor which could be sampled by the sensor bus of the sensor interface device. Virtually any type of sensor can be accommodated by a sensor bus with appropriate programming and modification of the software components associated with the sensor interface device—the sensor software component and the monitoring software component of the sensor interface device and server respectively could be created in a way to automatically recognize and adjust the data record also method and record structure used depending upon the type of sensor readings captured.

The method of the present invention could be offered either for a single customer in respect of one or more monitored assets or locations of that customer, or could also be produced as a larger service bureau, with the incorporation of appropriate authentication or security protocols. Whether one or more users of originating client devices were conducting sample requests with the server, a sample request itself could cover one or more monitored assets. For example a user may wish to simply view or extract relevant information with respect to a single monitored asset and associated sensor interface device, or in the case of the user having multiple remote assets being monitored the user may wish to see all of their sensor readings for the particular timeframe at the same time or in the same sample requests. Any type of approach which permitted through an appropriate user interface for the user of an originating client device to trigger a sample request with respect to one or more monitored assets which were being monitored in association with the remainder of the method of the present invention is all contemplated within the scope hereof.

The power supply of the sensor interface device used at each monitored remote location would be a self-contained power supply that did not require power input or the like, so that the sensor interface device of the present invention could be deployed on a long-term mobile basis in the field. For example the sensor interface device could comprise a battery with a related solar charging system. Any number of different types of low-power power supplies for use in conjunction with an appropriate and related low-power consumption sensor interface device, and all are understood to be contemplated within the scope of the present invention.

It is specifically contemplated that the network interface of the sensor interface device comprises cellular modem connected to a cellular data network, capable of communicating with the server via its own data network interface.

The invention also comprises a server for use in a method of monitoring local sensors associated with a plurality of monitored assets. Each remote asset being monitored has an associated sensor interface device associated therewith that comprises a processor, memory and a power supply, along with a wide area network interface. The sensor interface device also includes a geolocation device capable of capturing the geolocation of the sensor interface device at a given time and a sensor bus capable of connection to and reading from at least one local sensor associated with the remote asset. One or more local sensors associated with or connected to the remote asset are also connected to the sensor bus and comprise a component of the system for use in conjunction with the server. Finally the sensor interface device also includes a sensor software component which is operable on the processor and capable of initiating and completing periodic sensor data capture transmissions from the connected local sensors and transmitting the results of the readings captured from those sensors via the network interface to the server. The server itself comprises a processor and a memory capable of executing processor instructions, and a monitoring software component. The server is also operably connected to a database comprising an asset data set which comprises an asset record corresponding to each monitored asset and its associated sensor interface device, and a sensor data set comprising a plurality of sensor records each corresponding to a sensor data capture at a remote asset and containing a link to the related asset record, a timestamp of the capture time of the sensor data capture, the geolocation of the associated sensor interface device at the capture time, and the captured sensor readings for each active local sensor of the associated sensor interface device at the capture time. The links between the asset records in the sensor records can be provided by an explicit data token generated and stored in the sensor record corresponding to the asset record, or serial numbers, MAC addresses or other unique identifiers of the hardware associated with the sensor interface device at the asset being monitored could be used as a pre-existing data token useful for the purpose of matching up the information in question. It will also be understood that in certain embodiments, the asset data set and the sensor data set could potentially even be combined into a single set of records that contain all the necessary information to conduct the remainder of the method and that again any such modifications as might be required to implement such a data structure would also be contemplated within the scope of the present invention.

The monitoring software component of the server, outlined above, would be used to carry out a method which comprised the triggering of different subroutines, in operation, upon the existence of the desired conditions, to achieve the steps of the invention. Firstly, the monitoring software component could monitor the network interface of the server for receipt of sensor data capture transmissions from sensor interface device operatively connected via the network interface of the server, each of which corresponds to an individual sensor data capture transmitted from a sensor interface device. A sensor data capture transmission contains data values including the identity of the sensor interface device itself, the timestamp of the capture time, the geolocation of the sensor interface device at the capture time and of the captured sensor readings for each active local sensor of the associated sensor interface device and sensor bus at the capture time.

On receipt of a sensor data capture transmission, the monitoring software component would reformat or extract the necessary information from that transmission packet and create and store a sensor record in the database which contains the data values from the sensor data capture transmission.

In addition to monitoring the network interface of the server for the receipt of sensor data capture transmissions and the creation of corresponding sensor records, the monitoring software component would also be capable of facilitating the processing of a sample request received at the server from an originating client device in respect of at least one monitored asset. A sample request would be a request from an originating client device of the user requesting a data extraction or query from the database and specifically in respect of sensor records stored within the database. The sample request would include the identity of one or more monitored assets in respect of which data was requested, as well as the specified sample time period. On receipt of a sample request, the monitoring software component would cross-reference the identity of each selected monitored asset to an asset record in the database. Once the monitored assets were each matched with an asset record, any corresponding sensor records from the database which corresponded to the identified asset record, linked via the identification of the sensor interface device in question, and which were time-stamped within the sampling time period would be the extracted record set. The sample time period could be a single particular point in time—ie. the extracted record set could only include a single sensor record in respect of each selected monitored asset identified in the sample request, or the sample time period could be a longer time frame which would effectively potentially result in multiple sensor records in the extracted record set resulting in the ability to display and graph for example declining or increasing sensor values over the sample time period.

Following the selection of the extracted record set, the server and the monitoring software component would facilitate the transmission to an interface of the originating client device at least the geolocation and the captured local sensor readings for each sensor record of the extracted record set set via the display or interface of the originating client device, sorted in order of the timestamps thereof.

The sensor records in the database could be capable of storing the readings from any number of local sensors associated with the sensor interface device and the sensor boss of a particular monitored asset. In some cases the sensor interface device and sensor bus of a particular monitored asset might have only one local sensor, where in other cases there might be multiple sensors associated with a particular sensor bus and the sensor records and monitoring software component would be capable of accommodating both such approach. The local sensors which can be used in conjunction with the sensor interface device would be selected from at least the group of temperature sensors, liquid level sensors, dry level sensors or any other type of an active or passive sensor which could be sampled by the sensor bus of the sensor interface device. Virtually any type of sensor can be accommodated by a sensor bus with appropriate programming and modification of the software components associated with the sensor interface device— the sensor software component and the monitoring software component of the sensor interface device and server respectively could be created in a way to automatically recognize and adjust the data record also method and record structure used depending upon the type of sensor readings captured.

The server could in some embodiments be capable of two-way communication with the sensor interface device and the server could poll the sensor interface device associated with one or more monitored assets to trigger the origination of a sampling step and a subsequent sensor data capture transmission to the server. Various types of programmatic approaches to polling and triggering from the server and that these sensor data capture transmissions will be understood and contemplated within the scope of the present invention.

The monitoring software component could comprise mapping components that would allow for graphical mapping of a extracted record set to a user interface of an originating client device, so that the captured sensor readings from a particular rendered records that would be shown visually on a map using the stored geolocations of each related sensor record.

In addition to the method and the server outlined, the invention also comprises a self-contained sensor interface device for use in a method of monitoring at least one local sensor associated with a monitored asset. The sensor interface device would comprise a processor, memory and a wide area network interface for communication with a server, as well as a geolocation device capable of capturing the geolocation of the sensor interface device at any time and a sensor bus capable of connection to and reading from at least one local sensor associated with the remote asset to be monitored. The sensor interface device would also include a self-contained power supply that does not require external charging or power input thus allowing for long-term mobile and remote deployment of the sensor interface device in the field. The sensor interface device would include a sensor software component operable on the processor thereof, capable of initiating and completing periodic sensor data capture transmissions via the network search interface to a server via a connected network.

The sensor interface device in operation would use the sensor software component and upon detection of the existence of a data sampling condition or trigger indicating the need to conduct a sensor data capture, execute a data sampling workflow to capture and transmit local sensor readings to a server. The first step in the data sampling workflow would be to capture the timestamp of the capture time and the geolocation of the sensor interface device at the capture time. In addition to the timestamp in the geolocation, the software and hardware of the sensor interface device would also capture via the sensor bus sensor readings for each active local sensor of the associated sensor interface device in relation to the capture time.

The sensor software component would then electronically package and transmitted sensor data capture transmission to a server via the network interface. The sensor data capture transmission would contain the identity of the sensor interface device along with the timestamp, the geolocation, and the captured sensor readings for each active local sensor. The sensor data capture transmission when received by a server can be used to create a sensor record in a database, for using creation of a chronologically and geographically referenced data set of local sensor readings in respect of monitored assets associated with the sensor interface device. Sensor interface device of this Friday could be used in conjunction with the server and method outlined above.

The sensor interface device could contain a sensor bus capable of reading from one or more local sensors connected thereto. The local sensors connected to the bus might be hardwired or attached sensors in respect of the sensor interface device, or other embodiments of the sensor interface device could permit the infield attachment of the sensor interface device to pre-existing sensors. Either such approach, with the necessary modifications if any to the software and hardware of the sensor interface device to accommodate either the use of pre-existing infield sensors or hardwired or shipped from factory sensors for use in specific conjunction with the sensor interface device of the present invention are both contemplated within the scope hereof. The sensor interface device would be capable of operating in conjunction with a number of types of local sensors, including those selected from the group of temperature sensors, liquid level sensors, dry level sensors or any other type of an active or passive sensor which can be sampled by the sensor bus of the sensor interface device.

The sensor software component could be capable of triggering the sensor data capture transmissions based upon preprogrammed periodic time intervals, or other types of trigger conditions could also initiate such activity. Any number of types of locally triggered conditions which could result in a sensor data capture transmission will all be contemplated within the scope of the present invention. In other embodiments, a server in communication with the sensor interface device via the network interface could hold the sensor interface device to trigger a sampling step in a subsequent sensor data capture transmission, via the network interface.

Many different types of internalized power systems for the sensor interface device can be conceived—one of the primary means of provision of a self-contained power supply that does not require power input would be to use a power supply with the sensor interface device which comprised a solar charging system in a related battery.

Many different types of network interfaces can be used as a component of the sensor interface device although it wouldn't be specifically contemplated that a cellular modem or the like could be used which would allow for extreme far-reaching network use away from base.

BRIEF DESCRIPTION OF THE DRAWINGS

While the invention is claimed in the concluding portions, preferred embodiments are provided in the detailed description which may be best understood with the diagrams where like parts in each of the several diagrams are labeled with like numerals, and where:

DETAILED DESCRIPTION OF ILLUSTRATED EMBODIMENTS

Figure 1:
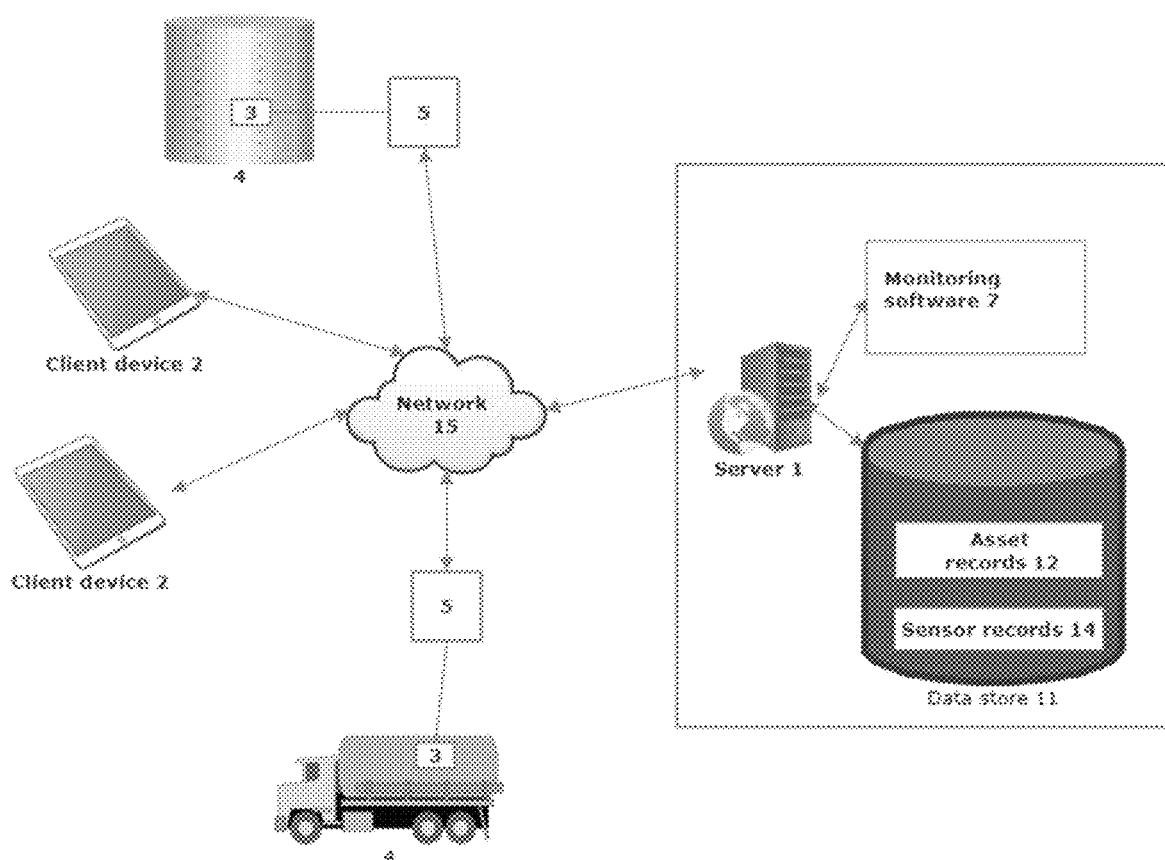
FIG. 1 is a block diagram showing the components of one embodiment of a system in accordance with the present invention.

As outlined above it is the object of the present invention to provide a method and related hardware for the tracking and subsequent query of sensor readings related to remote mobile assets. The following provides additional background and information—to appreciate the functionality of the invention is beneficial to establish certain terminology and context in relation to the remainder of the specification to describe the invention.

Remote Assets:

The remote assets in respect of which it may be desired to use the method of the present invention are any remotely located assets, stationary or mobile, which might require vocational testing or sensor readings to be captured or measured in respect of their performance or their contents etc. It is primarily contemplated that the remote assets that would most likely require monitoring in accordance with the method of the present invention could include dry or wet tanks or storage bins, for the storage of liquid, dry/particulate or gaseous material. It may be desired to from time to time be able to sample and/or determine the contents of such a remote container—either in terms of how full it is or in some cases how empty the container is as well. For example it may be desirable to be able to test the fuel tank on a remotely positioned piece of equipment, even mobile equipment, to ascertain when it is approaching empty and requires to be filled. In other circumstances, such as in extractive industries where extracted resources or materials are stored in a local staging container until they can be moved offsite by transport—for gathering of extracted material—may require the ability to test the content level and the local staging container to ensure that it does not come too close to full, rather than too close to empty, so that transport can be scheduled or dispatched to empty the container if required so that production is not interrupted. Any type of a container which might require periodic sampling or measurement of its contents, or emptiness thereof, regardless of the phase or nature of the content to be contained within the container are all contemplated within the scope of the present invention. Any such type of a container requiring sensor readings as to its contents could easily be equipped with a readable local sensor which would permit for capturing information related to the contents thereof. In addition to remotely located containers in which it was desired to measure contents or pressure, any number of additional types of remote assets are also conceivable in respect of which it might be desired to capture sensor readings. Any type of a remotely positioned or located assets, regardless of whether it is mobile or stationary, which has an operating state or any other type of a characteristic that it is desired to measure or monitor could be a remote assets within the scope of the method and the present invention outlined herein.

Sensor Types:

In addition to a liquid, dry/particulate, or gaseous content level or pressure sensor, other types of characteristics or locals of a remote asset might be desired to be measured. For example, it might be desirable to have a temperature sensor which will allow for the sampling of some kind of an operating temperature of a remote asset, the power sensor which would measure power being produced by an operating remote power asset, or any other type of a characteristic or operating state in relation to a remotely located assets, either mobile or stationary, and any type of a characteristic or operating state which was capable of being measured by a sensor readable by the sensor interface device and sensor bus of the present invention are all contemplated within the scope of the present invention.

In addition to the type of sensors and the type of operating states or values which might be desired to be measured in respect of remote asset, it will also be understood that multiple sensors could be used in respect of a single remote asset to capture multiple values or operating states as might be required. It is specifically contemplated that the method of the present invention would work similarly with a remote asset having multiple sensors associated therewith as a remote asset having a single sensor associated therewith, simply requiring modification to the sensor bus of the related sensor interface device which would permit the connection or monitoring of a plurality of sensors corresponding to the number of sensors were readings to be captured in respect of the remote asset in respect of which that sensor interface device was associated.

The sensors in respect of remote asset might be previously installed sensors, being of a standard connection or power format, which could be inter-operably connected to the sensor bus of the sensor interface device of the present invention if the sensor bus were, as is expected, manufactured to prevent same. Alternatively, the sensors in respect of a remote asset could also be hardwired or integrated directly with the sensor interface device itself, with the necessary and attendant modifications to the behaviour of the sensor interface device and the configuration of the sensor bus. Finally, the sensor bus of the sensor interface device of the present invention could also be manufactured to permit the interchangeable use of a combination of previously installed sensors at or in respect of a remote asset, or one or more integrated or hardwired sensors which might be directly connected and manufactured in conjunction with the sensor interface device. All such combinations of the sensors are contemplated within the scope of the present invention.

Dependent upon the nature of the measurement to be captured by one or more sensors in relation to a remote asset, the monitoring software component of the server or the sensor software component of the sensor interface device could be modified or programmed to adapt to the different types of measurement scales associated with different types of sensors. Provision of an adaptable hardware and software combination for the interoperability of the method and the hardware of the present invention with various types of pre-existing or integrated sensors responsible or capable of measuring many different types of measurements, operating states or the like, will all be understood to be within the scope of the present invention.

System Overview:

The method of the present invention comprises a method for the monitoring of local sensors associated with a plurality of monitored assets. Each remote asset has a sensor interface device associated therewith and attached or positioned in proximity thereto. FIG. 1 is a schematic diagram of a sample of a system of hardware and components which in conjunction will achieve the method of the present invention and is included for demonstrative purposes. The system shown in this Figure shows two remote assets 4, each of which is a tank as shown. One of the tanks 4 it is stationary and the second one is a mobile tank truck—these two types of tanks 4 are shown for the purpose of demonstrating that the method of the present invention could be practice in association with both mobile and stationary remote assets 4.

In addition to the tanks 4 to be monitored there is shown a server 1. The server 1, as outlined in further detail elsewhere herein comprises typical hardware components and method specific components including a monitoring software component 7 for the purpose of administering the method of the present invention as well as in the data store 11 which includes a data set of asset records 12, each of which corresponds to a remote asset 4, and a plurality of sensor records 14 which each represent a sensor reading captured in relation to the remote assets 4. The server 1 includes a network interface connected to a wide-area data network 15 by which the server 1 can communicate with other hardware components.

Each of the remote assets 4 shows a single sensor 3 associated therewith. The sensor 3 in this case likely would comprise a level monitor which could be read for the purpose of determining the level of fullness or emptiness of the tank associated, however as outlined elsewhere herein, multiple sensors 3 could be used in respect of a particular remote asset. A sensor interface device and will find is shown in association with each remote asset 4. The sensor interface device 5 is the purpose built hardware outlined elsewhere herein which includes a sensor bus in communication with the sensor 3 of the associated remote asset 4. The sensor interface device 5 would also include a network interface to the network 15 via which it could communicate with the server 1.

Finally shown are two client devices 2. The client devices 2 would be used for communication by a user with the server 1 in the execution of sample requests and extraction requests in relation to the remainder of the method of the present invention. The client devices 2 could comprise a number of different types of mobile or stationary computing devices capable of communicating and interacting with the server 1 via individual network interfaces to a wide-area data network 15. In certain cases with the server 1 included Web server components, the client devices 2 could be any type of a mobile or stationary computing device with a browser capable of interacting with the server 1 install their own. In other cases, the client device 2 could include a purpose built software application for the purpose of communication with the server 1 and again both such approaches are contemplated within the scope of the present invention. Having reviewed quickly the overall system architecture of FIG. 1 for the purpose of generally referencing and demonstrating the operation of the method of the present invention is not desired to review the actual steps of the method of the present invention in further detail as follows.

Figure 2:
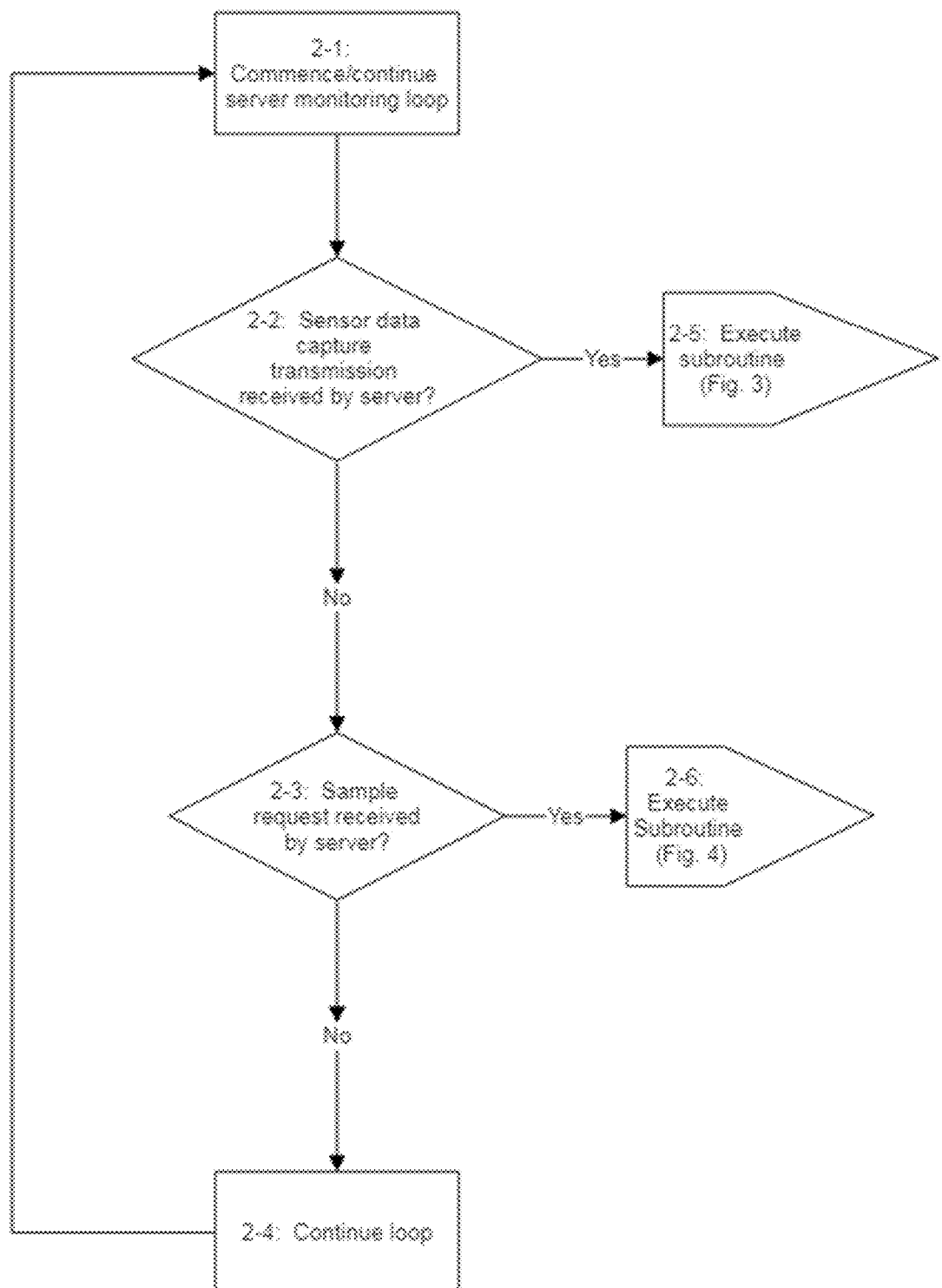
FIG. 2 is a flowchart demonstrating the steps associated with one embodiment of the overall method of the present invention.
Figure 3:
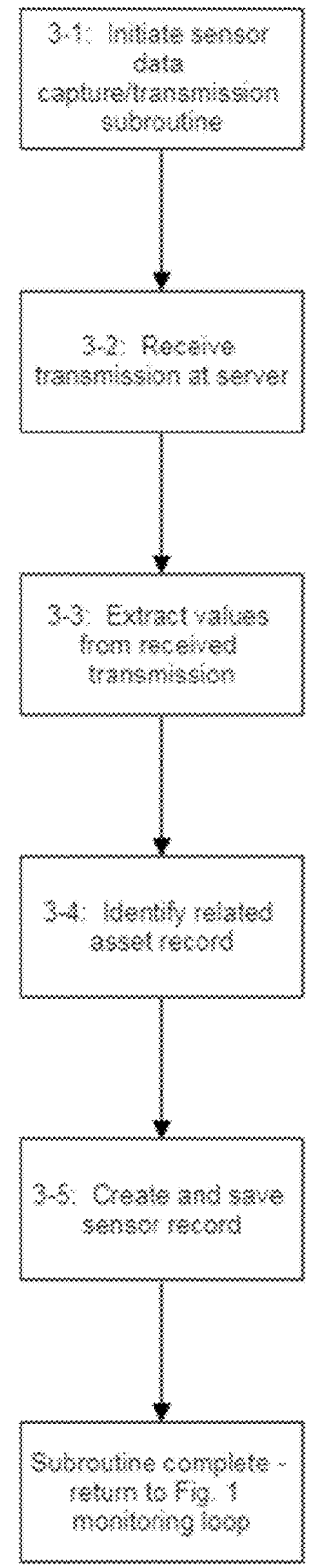
FIG. 3 is a flowchart showing one embodiment of a sensor data capture transmission subroutine called from the method of claim 1.
Figure 4:
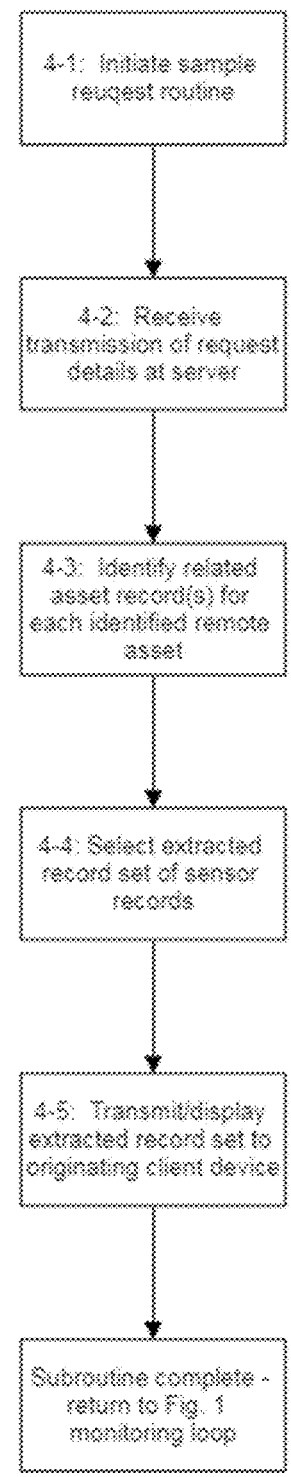
FIG. 4 is a flowchart showing one embodiment of a sample request subroutine called from the method of claim 1.

Method Overview:

A demonstrative embodiment of the method of the present invention in respect of the server and its behaviour is shown in FIGS. 2 through 4. Referring first to FIG. 2 there is shown a flowchart representing the steps in basic high-level embodiment of the method of the present invention, as will be embodied and executed by software 7 installed on the server 1.

As outlined above, and in conjunctive reference to FIG. 1, the method of the present invention comprises a method of monitoring local sensors 3 associated with remote assets 4. Each monitored asset 4 has an associated sensor interface device 5 connected to it. The key components of the sensor interface device 5 associated with each monitored asset are a processor, memory and a wide area network interface, a geolocation device capable of capturing the geolocation of the sensor interface device at any given time, and a sensor bus capable of connection to and reading from at least one local sensor. A sensor software component is capable of initiating sampling of the attached sensors and completing periodic sensor data capture transmissions via the network interface to a server. The sensor bus might allow for the connection of pre-existing or third-party local sensors 3 in relation to the remote asset 4, or the at least one local sensor 3 might be integrated or directly connected by the sensor bus to the remainder of the sensor interface device 5.

The sensor interface device 5 associated with each remote asset 4 to be monitored will be in network communications via its network interface with a server 1. The server 1 comprises a processor, a memory and a network interface capable of communication by at least one wide-area data network with at least one client device 2 of a user as well as with the sensor interface device 5 associated with each monitored asset. In addition to the network interface, the server also comprises a database containing an asset data set comprising asset records corresponding to each monitored asset and its associated sensor interface device, and a sensor data set which comprises sensor records each corresponding to a sensor data capture in respect of a remote monitor asset. Each sensor record would correspond to a particular sensor data capture by a sensor interface device 5 and would contain a link to a related asset record, the timestamp of the capture time of the sensor data capture being stored, the geolocation of the associated sensor interface device at the capture time, and captured sensor readings for each active local sensor attached via the sensor bus to the associated sensor interface device 5 at the capture time.

The server 1 also comprises a monitoring software component for carrying out the steps of the method. One function of the monitoring software component in conjunction with the remainder of the hardware and software components of the server 1 is to maintain, during operation of the method, a monitoring loop whereby the network interface of the server is monitored for the receipt of data transmissions from sensor interface device 5 or data extraction requests from client devices 2.

Referring to flowchart of FIG. 2, there is shown a monitoring loop at Step 2-1. The monitoring software component 7 in conjunction with other components of the server 1 would monitor the network interface 9 of the server 1 to detect the receipt of triggering transmissions either from sensor interface device 5 associated with remote assets or, or from client devices 2 upon the receipt of a trigger and transmission as further outlined below, the software could trigger further activity.

Upon receipt of a sensor data capture transmission by the server 1 on a network interface 9 from a sensor interface device 5 operatively connected to the same data network 15, shown at step 2-2, the monitoring software component 7 could trigger the execution of a sensor data capture transmission subroutine. Triggering of the subroutine of FIG. 3 based upon the receipt of such a transmission by the server 1 is shown at step 2-5.

Similar to monitoring the network interface of the server 1 for the receipt of sensor data capture transmissions, the software module 7 and a related listener and monitoring loop could also monitor the network interface in connection of the server 1 for the receipt of data sample requests from originating client devices 2. The detection of the receipt of a sample requests by the server is shown at step 2-3. If a sample request was received, the software module 7 could trigger the execution of a sample extraction subroutine, such as is shown in FIG. 4. The triggering of that subroutine is demonstrated at step 2-6 of FIG. 2.

The capture and processing of sensor data transmissions, and the capture and processing of indications of sample or extraction requests are the two key elements of the method of FIG. 1. Beyond the 2 monitoring blocks shown in the flowchart of FIG. 2, the loop is shown to continue. It will be understood that the specific behaviour and operation of the monitoring software component 7 could take many different forms and all are contemplated within the scope of the present invention.

Referring now to the subroutine demonstrated in FIG. 3 we will review the steps involved in a sample embodiment of a sensor data captured transmission transaction by the monitoring software component 7 of the server 1. Effectively this subroutine will result in the creation and storage of a sensor record 14 to the data store 11 in respect of a particular sensor data capture transmission received at the server 1. The initiation of the subroutine is shown at step 3-1 of FIG. 3. In respect of particular data capture transmission transactions received at the server 1 from sensor interface device and modified as well is in respect of data extraction sampling transactions outlined further below, it will be understood that it and any necessary security or device authentication which is desired to be implemented between the server 1, sensor interface device 5 and/or client devices 2 for the purpose of only permitting authorized devices to participate in the method of the present invention will be understood to those skilled in the art of hardware, software and security design and all such approaches are contemplated within the scope of the present invention. Any necessary modifications to the software components installed on the sensor interface device is required for the server 1 or the client device 2 to effect the desired security protocols and design are also contemplated herein.

The server 1 will receive the complete sensor data capture transmission via the network interface, at or following the initial indication received at the server 1 from a sensor interface device 5. The transmission itself will include the necessary information to create, populate and save a sensor record 14 in the data stored will 11. The information that will be included within the complete transmission which will be received for extraction and processing at the server 1 includes an address or identifier of the sensor interface device 5, the timestamp of the capture time, the geolocation of the sensor interface device 5 at the capture time, as well as sensor values capture from the sensor bus of the sensor interface device 5 for every active local sensor connected to the sensor bus at the capture time.

On receipt of a complete sensor data capture transmission at the server, shown at step 3-2, the monitoring software component 7 could parse or process to receive the transmission to extract the necessary values therefrom—this is shown at 3-3. Any necessary software modifications to the monitoring software component 7 to properly parse or process transmissions received from various types of sensor interface device 5, or even making the monitoring software component 7 adaptive to be capable of properly parsing or processing transmissions received from different types of sensor interface device 5 is contemplated within the scope of the present invention.

The next step of the method of FIG. 3 within the data capture subroutine would involve monitoring software component 7 using the address or identifier of the sensor interface device and the five extracted from the receipt transmission to cross reference and identify a related asset record 12 in respect of the data transmission received. The related asset record 12 is used to link the sensor record 14 to be created in respect of the transmission to a particular remote asset 4 being tracked. An alternative to linking the sensor record and the transmission details received from the sensor interface device 5 to a particular asset record 12 would be in a different data structure that did not include separate asset records 12 to potentially store the identity of the remote asset in fixed memory on the sensor interface device 5 and to include the identity of the remote asset in transmissions of sensor data captures to the server. Both such approaches are contemplated within the scope of the present invention although it is contemplated that the use of the asset record and sensor record linked design structure for the data store 11 likely provides better reporting functionality and flexibility.

Figure 6:
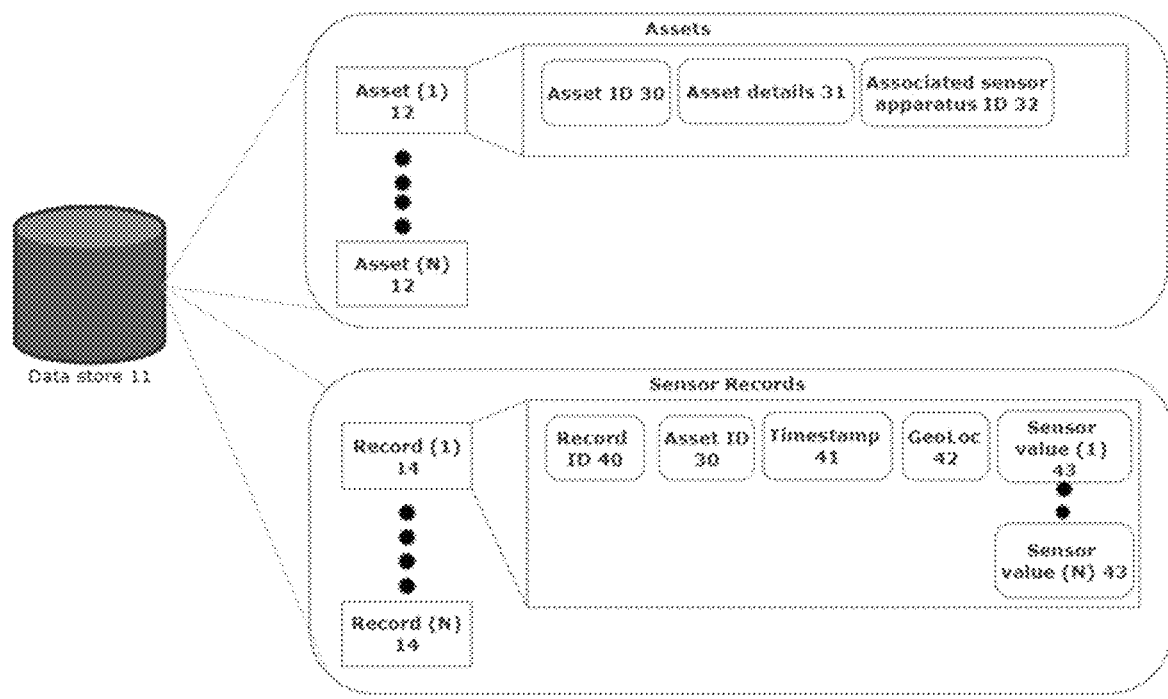
FIG. 6 is a diagram showing a sample of a data structure of the database of the present invention.

Having identified the related asset record 12, the software component 7 will then create and save a sensor record 14 to the data store 11. This is shown at Step 3-5. As outlined above in most basic embodiment the sensor record 14 would include at least a link to the related asset record, the timestamp of the capture time, the geolocation of the associated sensor interface device 5 at the capture time, as well as all of the sensor values captured in respect of all active local sensor is connected to the sensor bus of the sensor interface device. Following the completion and saving of the sensor record 14 to the data store 11 the subroutine is complete patent and control of the server 1 could be returned to the primary software workflow shown in FIG. 1. FIG. 6 shows the demonstrative data structure for a basic embodiment of the data store 11 in accordance with some embodiments of the present invention. The details of the data structure FIG. 6 are detailed below. It will be understood that the server 1 and the related monitoring software component 7 could permit parallel processing of multiple operations at the same time i.e. multiple sensor data capture transmissions could be received and processed in parallel up the same time or alongside the processing of one or more data sampling requests received from client devices 2.

One of the keys to the method of the present invention is that the captured sensor readings for each active local sensor of the associated sensor interface device at a capture time will always be stored in conjunction with the timestamp of the capture time, as well as the geolocation of the sensor interface device at the capture time. This allows for time-based filtering of the related sensor records as well as the mapping of the sensor readings and the location of the sensor interface device at the appropriate capture times based on the captured geolocations. The geolocation is an important aspect of the data capture since it is explicitly contemplated that the sensor interface device used in conjunction with the remainder of the present invention insofar as it is self-contained and allows for remote operation could be attached to mobile remote assets to be monitored, such as tanks or particulate bins on trucks or the like, or while the sensor interface device could be mobile it could also be used in conjunction of the stationary asset with the geolocation still being captured and stored.

The second subroutine of the overarching method of FIG. 1 is a data sample request handling subroutine, shown at FIG. 4 in which would be triggered typically upon the request for a particular data extraction transaction to be executed against the data store 11 by originating client device 2. It is particularly contemplated that a user by originating client device 2 might at a particular time desire and up-to-date instant sensor reading or most recent sensor reading in respect of one or more remote assets 4 attached to their account within the system of the present invention, or might in alternate embodiments desired rather than the most instant sensor reading in respect of one or more remote assets 4 desired a longer-term dataset which could be graphed for the purpose of understanding level changes. In any event, it is explicitly contemplated that the software interface between the client devices 2 and the server 1 would permit either on an ad hoc or a scheduled basis for a user to initiate a sample request to extract local sensor values from a particular time window for display or use by the user at the client device 2.

Initiation of the sample request could for example on an annual basis take place by the user of a client device 2 in interaction with the server 1 initiating a communication session with the server 1 calling for a particular sample request to be action. The sample request itself, in addition to being initiated inside of whatever type of an authenticated user session might be required dependent upon the security model deployed in the system of the present invention, would identify one or more monitored assets 4 associated with the user as well as identifying a specified sample time period. The specified sample time period as is outlined above could be of varying lengths—the method can be modified to accommodate a short sample time period, which might indicate a desire for the user initiating the request to just access the most recent sensor reading from the one or more monitored assets 4 identified, or if the sample time period indicated by the user in the sample request was a longer time window it might be desired obviously to extract a plurality of data points over time in respect of particular sensor readings at the monitored assets 4 in question for graphing, scheduling, or deliver your time management purposes. Either approach will be understood to be within the scope of the present invention i.e. a short sample time period which would correspond only to the most recent data point captured in respect of each monitored asset 4 the subject of the sample request, or a longer sample time period. In further embodiments of the method of the present invention the software interface between the originating client device 2 and the server 1 could actually permit or allow the user as a part of his request to the server 1 to transmit a request that would require a network call back to the related sensor interface device 5 on receipt of the sample request to capture an instant set of local sensor values [and the related creation of a sensor record 14]. Those could be incorporated into a longer-term dataset related to a longer sample time period, or in the case of only a single data point being required, the sample time period used could action be the current time of submission of the sample request resulting in the data call to the sensor interface device 5 related to the monitored assets 4 in question.

Based on the nature of the data structure outlined elsewhere herein, upon receipt of the sample request at the server 1 from an originating client device 2, the sample request would be processed to extract from it the identity of the remote assets 4 in question which were the subject of the sample request. For example, between the originating client device 2 of the server 1 a graphic interface to be provided which would allow the user to select from related remote assets 4 to be the subject of sample request, and when the sample request was transmitted back to the server 1 with necessary data corresponding to the identified and related remote assets 4, those could be cross-referenced to assess records and will 12 in the data store 11. Many different types of client/server user interfaces could be contemplated which would allow a user to identify remote assets 4 in respect of which they wanted to make a sample request to extract data from the data store 11 and any type of a software approach permitting the user to select one or more remote assets 4 in respect of which they had the appropriate security credentials or requirements are all contemplated within the scope of the present invention. Receipt of the transmission of the details of a sample request at the server are shown in step 4-2, and identification of the related asset records 12 for each identified remote asset 4 are shown at step 4-3.

Following the selection or identification of related asset records 12, the monitoring software component 7 would execute a database search transaction against the sensor records 12 stored within the data set 11 to select an extracted record set of sensor records 12. The extracted record set would consist of all of the sensor records related to sensor data capture transmissions received by the server 1 from all sensor interface device 5 related to the identified related asset records 12 within the sample time period. Selection of the extracted record set of related sensor records 14 is shown in step 4-4.

The final step in the sample request and data extraction subroutine is the facilitation of the transmission or display of the extracted record set to the originating client device 2. The results of the extracted record set of related sensor records would be transmitted to the originating client device 12 and displayed each in association with the geolocation of the related sensor interface device 5 at the time of each data capture, sorted in order of capture time. As outlined elsewhere herein, the monitoring software component 7 on the server 1 might include mapping components which would allow for the transmission of graphic mapping indicating the captured sensor values at particular times. In some cases the display of the extracted record set at the originating client device 2 would comprise a textbased display on a user interface or display of the device 2, where in other cases where a visual display was desired and the monitoring software 7 comprised mapping components, the contents of the extracted record set could be displayed in association with their individual geolocations—i.e. each sensor record from the extracted record set could result in a captured sensor value or values being displayed at a particular geolocation on a map. A final approach to facilitating the use of the extracted record set by an originating client device 2 would be to provide access to the extracted record set to the originating client device 2 via an API or the like for third-party use. All such approaches will be understood to be within the scope of the present invention.

Where some sensor interface devices 5 include more than one sensor operatively connected to the related sensor bus 9, the user of the originating client device 2 could as a part of origination of their sample request specified one or more value types that they wish to be included in the sample request. For example, where the sensor interface device 5 related to some remote assets 4 included connection to both a volume sensor and a temperature sensor and the user is only interested in the volume sensor values at a particular time, they could specify that they only wish to see the volume values in respect of a particular sample request. Any number of different types of data filtering and limiting aspects of the origination of a sample request or the resulting reporting are all contemplated within the scope of the present invention.

Where the extracted record set prepared in response to a sample request received by the server includes extracted sensor records 14 in respect of stationary remote assets 4, the same geolocation would be displayed, in aggregate, in respect of all those values. Alternatively where the stationary remote asset or assets 4 be tracked at which are included in the extracted record set were mobile and had moved during the sample time period, the moving or different geolocation's at each status that would be included in the dataset transmitted to the originating client device. Both such approaches are contemplated herein.

It is also specifically contemplated as outlined above that one of the key implementations of the method of the present invention would incorporate the initiation of a new data capture transaction to the sensor interface device 5 in respect of one or more remote assets 4 as a part of a sample request, to obtain the most up-to-date information. Where it is desired to use the system of the present invention to provide a single data point at a current and narrow sample time period, it will be understood that the single new sensor record 4 created in response to the new data capture transaction triggered as part of the sample request would comprise the single extracted sensor record 14 in respect of that particular sensor interface device 5. Again the use of the system and method of the present invention to provide up-to-date and contemporaneous sensor readings from all of the remote locations of the remote assets 4 monitored in accordance with the present invention, or historical and/or graphic reporting are all contemplated within the scope of the present invention.

In addition to permitting for user triggered sample requests from originating client devices 2, the monitoring software component 7 the server 1 might also be programmed to provide periodically scheduled or triggered sample extraction reports etc. and this will also be understood to be within the scope of the present invention.

The monitoring software component and specifically the components of the monitoring software component related to the handling of sample requests from client devices could allow for adaptation of the output of the results of an extracted record sent to the display or interface of a particular originating client device based upon the sensor types, volume of the container where the local sensors were level sensors, or other types of adaptations. Again, the ability to modify the software of the system of the present invention to accommodate these different types of sensors at one or more monitored assets will be understood to those skilled in the art and are all contemplated within the scope of the present invention.

When the monitoring software component was facilitating the display of the results of a sample request to an interface of an originating client device, that could be done in a textbased format, showing a report that was produced on or via a user display interface of the originating client device including the geolocation and the captured sensor readings from any active local sensors at the particular one or more monitored remote locations or assets within the particular desired time window, or in other embodiments the monitoring software component could contain or interface with graphic mapping software such that the display of the rendered records sent to a graphical user interface of the originating client device would result in the display of a graphical map with the captured sensor readings graphically presented thereon in visual reference to the location stored as the geolocation in respect of each rendered sensor record. In further embodiments of the method of the present invention, rather than providing either graphical or a textbased display, the presentation of the results of a sample request to the interface of an originating client device could be the transmission of raw data results via a API or the like.

The method of the present invention could be offered either for a single customer in respect of one or more monitored assets or locations of that customer, or could also be produced as a larger service bureau, with the incorporation of appropriate authentication or security protocols. Whether one or more users of originating client devices were conducting sample requests with the server, a sample request itself could cover one or more monitored assets. For example a user may wish to simply view or extract relevant information with respect to a single monitored asset and associated sensor interface device, or in the case of the user having multiple remote assets being monitored the user may wish to see all of their sensor readings for the particular timeframe at the same time or in the same sample requests. Any type of approach which permitted through an appropriate user interface for the user of an originating client device to trigger a sample request with respect to one or more monitored assets which were being monitored in association with the remainder of the method of the present invention is all contemplated within the scope hereof.

Figure 5:
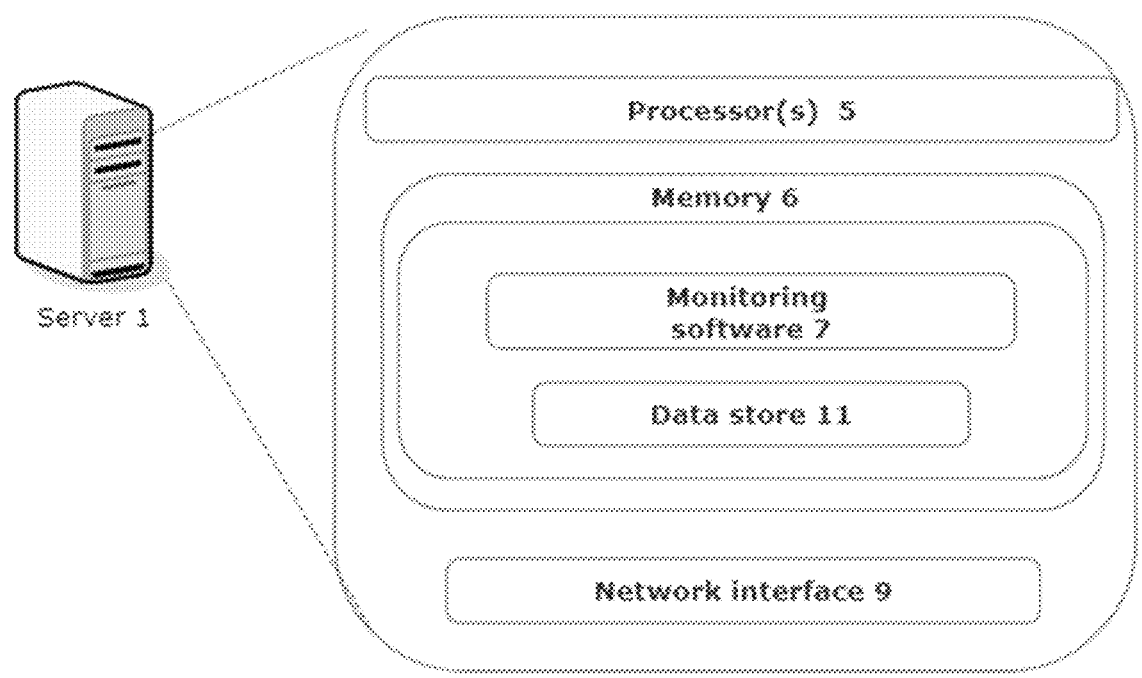
FIG. 5 is a block diagram showing the components of one embodiment of the server of FIG. 1.

Server:

The overall architecture of the method of the present invention including the hardware would be client/server in nature, and would rely on server 1 configured for the capture, storage and extraction of remotely captured sensor values in respect of remote assets 4. The server 1, a sample embodiment of which is shown in FIG. 5, might consist of one or more servers 1—a single server or a server farm approach. The server 1 would comprise one or more processors 5 and memory 6. The memory 6 might include various processor instructions for the method of the present invention or otherwise in operating the server 1. Processor instructions corresponding to the monitoring software component 7 are shown stored within the memory 6 in this Figure. The server 1 may be configured by machine-readable instructions, which may include one or more instruction components. The instruction components may include one or more of server firmware or operating systems, the monitoring software component 7, and/or other instruction components.

Memory 6 may comprise non-transitory storage media that electronically stored information. Electronic storage media of memory 6 may include one or both of system storage provided integrally with server 1 and or removable storage that is removably connected to the server 1 via, for example, a port or a drive. Memory 6 may include one or more of optically readable storage media, magnetically readable storage unit electrical charge based storage media, solid-state storage media and or other electronically readable storage media. Memory 6 may include one or more virtual storage resources i.e. cloud storage, a virtual private network or the like. Memory 6 may store software algorithms, information determined by processors 5, information received from servers, information received from client devices 2 and or other information that enables the server 1 to function as described as outlined herein.

The processor 5 may be configured to provide information processing capabilities in the server 1. Processor 5 may include one or more of a digital processor, an analog processor, a digital circuit design and process information, and analog circuit designed to process information, state machine and/or other mechanisms for electronically processing information. Although the processor 5 is shown regarding this Figure as a single entity, this is for illustrative purposes only. In some implementations the processor 5 may include a plurality of processing units which may be physically within the same device, or may represent processing functionality of a plurality of devices operating in coordination.

In many embodiments the server 1 is contemplated to be a Web server 1, where client devices 2 would use a web browser or a locally installed software application for interaction therewith via a network communication or a call. Where a local application was developed, the server 1 might not be a Web server 1 per se but might be a network server 1 capable of interaction with the type of an interface on the remote client devices 2 required to facilitate the operation of that software application. Either such approach is contemplated within the scope.

The server 1 would also be operatively connected to or comprise a data store 11. Besides the general operating system instructions, the server 1 would comprise a monitoring software component 7 responsible for execution of the process and method of the present invention at the server 1 and coordinating communication with client devices 2. The monitoring software component 7 might itself act as the interface between the remainder of the hardware and software of the is 1 and the data store 11, or the server 1 might include additional software interfaces to the data store 11.

The monitoring software component 7 would comprise subroutines to administer the data store 11, creating, modifying and processing data transactions and records in the data store 11, and any additional financial or numerical transactions, searches for reporting as required. The details of the monitoring software component 7 and its key functionality are outlined elsewhere herein.

Server 1 also requires at least one network interface 9 by which the server 1 could communicate with at least one client device 2 and at least one sensor interface device 5 over at least one communications network. It will be understood by those skilled in the art of network, hardware and software design that certain server architectures might include more than one network interface 9 and any type of server 1 and network interface design which enabled the communication of the server 1 with at least one client device 2—the plurality of sensor interface device 55 one or more data networks as outlined elsewhere in the remainder of the method would all be contemplated within the scope of the present invention.

Monitoring Software Component:

The monitoring software component 7 will generally speaking be understood to be any set of computer processor instructions that will facilitate the execution of the method of the present engine as otherwise outlined herein. The monitoring software component 7 will, in cooperation and operation with hardware components of the server 1, facilitate the execution of the method such as is shown demonstrative embodiments of FIGS. 2 through 4.

The monitoring software component 7 or other software on the server 1 will also provide an interface by which an administrator or user of the method, either by a client device 2 in communication with the server 1 or through a data interface could administer, create and edit necessary configurations and records in the data stored in row 11 or otherwise—for example to create a new asset records 12 or the like. Creation of the necessary administrative or reporting interface within the software component 7 would be understood to be within the scope of the present invention as well.

Client Devices:

As outlined elsewhere herein, the method of the present invention explicitly contemplates the use of network enabled client devices 2 by users to initiate various types of data transactions under the remainder of the method. It will be understood by those skilled in the art of client/server application design that any type of a client device 2 which could communicate with the server 1 via a data network and a related network interface would be within the scope of the present invention. Smart phones, PCs and other remote and network capable computing devices are all devices understood to be contemplated within the context of client devices 2 and the scope of the present invention, insofar as they will each include a network interface by which the client device 2 could communicate via a data network with the server 1.

The client device 2 may include pre-existing software such as a browser or local application for example, which could facilitate the method of the present invention or in other cases specific purpose built client software could be used. Architecturally and conceptually, the concept of "apps" use of smart phones and other personal devices is widely known. The specifics of implementing the client/server software system using a website or a central bureau and an interface for the client device 2 of users will be easily understood by those skilled in the art of client/server software design and the method of the present invention of implementing such a similar approach is contemplated within the scope of the present invention.

Development of either a browser interface or a local app interface as the user interface between the user of a client device 2 and the server 1 and the monitoring software component 7, along with the remainder of the hosted and executed method, will be understood to those skilled in the art of client/server database and application design and again all such approaches are contemplated within the scope of the present invention.

Communications Network:

It is specifically contemplated that the communications network used for communication between the server 1 and the client devices 2 and the sensor interface device 5 could be the Internet or another publicly available wide-area network. The removal of a requirement for a proprietary or closed communications network between remote client devices 2, the sensor interface device 5 and the server 1 facilitating the method represents one significant enhancement and cost efficiency of the method of the present invention. The specific protocol of communication between the devices can vary, and different communication protocols could be used between different devices in the system. All such approaches and architectures will be understood to those skilled in the art of wide-area computer network design and all are contemplated within the scope of the present invention. It will be understood that private networks could also be used in place of the internet albeit with the added cost and complexity in terms of client software communication. Also contemplated is a scenario in which more than one communications network was used i.e. one communications network and a first network interface on the server 1 to communicate with one or more client devices 2 of a particular type, and a separate network interface and/or data network might facilitate communications with sensor interface device 5.

Sensor Interface Device:

In addition to the method and server outlined, the invention also comprises a self-contained sensor interface device 5 for use in a method of monitoring at least one local sensor associated with the monitored asset. It is particularly contemplated that the sensor interface device 5 would most cost efficiently be produced as a custom manufactured hardware device including the necessary equipment and comments outlined, although it will be understood that pre-existing hardware components could also be programmed with an appropriate sensor software 23 to achieve the same objective.

Figure 7:
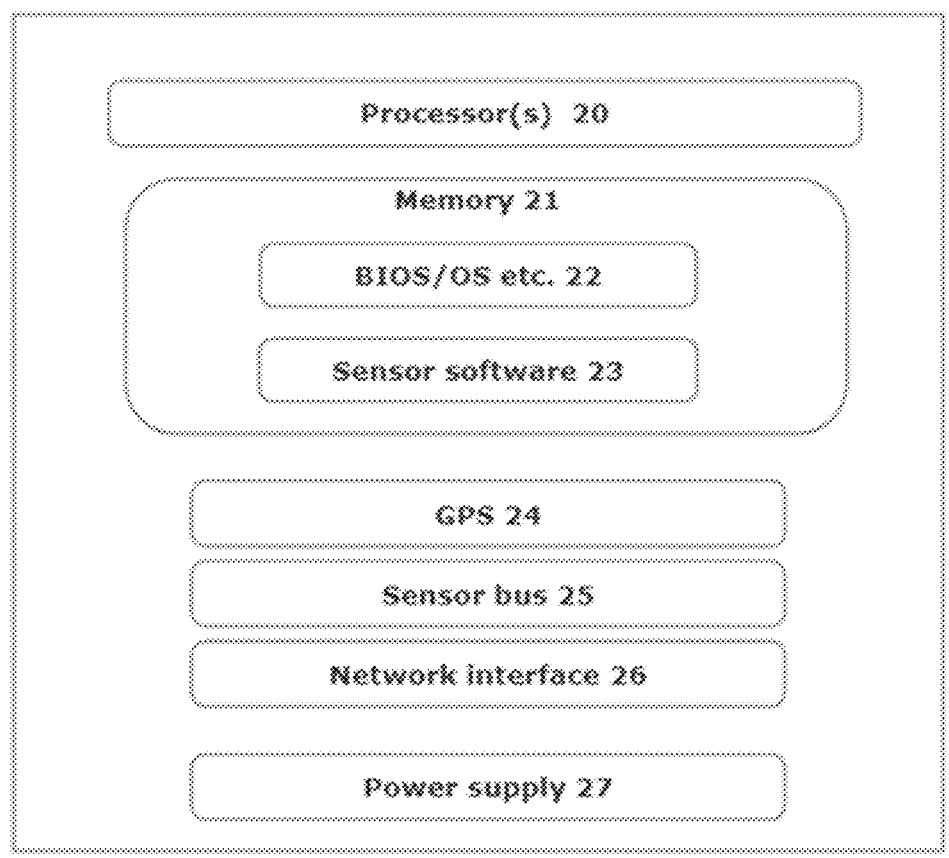
FIG. 7 is a block diagram demonstrating the components of one embodiment of the hardware of a sensor interface device in accordance with the present invention.

FIG. 7 is a block diagram demonstrating the key hardware and software components of the sensor interface device 5 as contemplated herein. The design of freestanding industrial hardware or computer controller such as those shown will be understood to those skilled in the art of hardware design. The sensor interface device 5 processor or processors 20 which in conjunction with a clock etc. would facilitate the execution of various storing processor instructions in conjunction with the remainder of the method of the present invention. Also shown in the embodiment of FIG. 7 is a memory 21, containing BIOS and operating system instructions etc. 22 as well as a customized set of processor instructions for the execution of aspects of the method of the present invention being a sensor software component 23. The memory 21, either static or fixed, might also include additional processor instructions or storage locations for the storage of processor instructions for the execution of the method or other interim or long-term variables and information to be stored thereon.

In addition to the processor 20 and the memory 21 with the various software components associated therewith, sensor interface device 5 would also include a GPS 24 or other hardware device capable of capturing the geolocation of the sensor interface device 5 at any time. Many different types of geolocation modules will be understood although a GPS module 24 is the likely most cost efficient means of being able to on demand capture the geolocation of the sensor interface device 5.

The sensor interface device 5 also includes a network interface 26, which is explicitly contemplated to likely comprise a cellular modem or the like which on a low-power basis would enable the remote communication of the sensor interface device 5 with the server 1 in accordance with the remainder of the present invention by a data network 15. The network interface 26 could also comprise other types of radio or other types of transmission or receiving hardware and related software to allow for the mobile communication of the sensor interface device 5, as instructed or directed by the sensor software 23 and related software components thereon, in participation in the method of the present invention.

The sensor interface device 5 would also include a self-contained power supply 27 that does not require external charging or power input. It is specifically contemplated that the self-contained power supply 27 might easily comprise a small solar panel and battery which could be used in conjunction with the remainder of the sensor interface device to provide a long-term rechargeable power supply. Given that the electronics of the sensor interface device 5 are not contemplated to require significant power, a smaller battery with the solar charging ability is one obvious in primary means of powering on a long-term basis the sensor interface device 5 without the need for long-term external power or charge. This significantly enhances the remote functionality of the sensor interface device 5 and will allow for the use of the sensor interface device 5 in remote areas that are otherwise not serviced by power which could be to charge a battery or to provide direct power supply to the sensor interface device 5.

The final key component of the sensor interface device 5 is the sensor bus 25. The sensor bus 25 provides connectivity for one or more local sensors to the sensor interface device 5 to allow for the capture of local sensor readings in respect of those sensors related to an associated remote asset 4. It is specifically contemplated that the sensor bus 25 in certain embodiments of the sensor interface device 5 would permit the connection of a single local sensor thereto, or in other embodiments the sensor bus could provide multiple connection ports or the ability to daisychain multiple sensor connections onto the sensor bus 25 to allow for the capture of sensor readings from multiple sensors connected thereto. To the extent that the sensors 3 to be connected to the sensor bus 25 require power, the sensor bus 25 could be configured the power supply 27 of the sensor interface device and will power the sensors as required. As outlined elsewhere herein, while it is explicitly contemplated that level sensors are the likely primary use in the short term methodology of the present invention, to remotely monitor the level of fill or depletion in a particular container, tank or the like, virtually any number or type of sensors could be connected to the sensor bus 25, requiring only modification to the sensor software component 23 to accommodate the different scales or readings acquired from different sensors connected to the sensor bus 25, in fact the adaptability of the sensor software 23 to accommodate different types of sensors connected to the sensor bus 25 is one of the benefits of the system the present invention, since a single sensor interface device could potentially be used with multiple different types of sensors if the sensor software 23 itself were adaptable and could automatically or based upon user configuration accommodate different types of sensors 3 to be connected thereto.

The sensor software component 23 operable on the processor 20 thereof, in addition to having the necessary configuration to read and capture values from the local sensors connected to the sensor bus 25 would also be capable of initiating and completing periodic sensor data capture transmissions via the network search interface to a server 1 via a connected network.

The sensor interface device 5 in operation would use the sensor software component 23 and upon detection of the existence of a data sampling condition or trigger indicating the need to conduct a sensor data capture, execute a data sampling workflow to capture and transmit local sensor readings to a server 1. The first step in the data sampling workflow would be to capture the timestamp of the capture time and the geolocation of the sensor interface device 5 at the capture time. In addition to the timestamp in the geolocation, the software and hardware of the sensor interface device 5 would also capture via the sensor bus the current active local sensor readings for each active local sensor in relation to the capture time. The sensor software component 23 would then electronically package and transmit a sensor data capture transmission to a server via the network interface. The sensor data capture transmission would contain the identity of the sensor interface device along with the timestamp, the geolocation, and the captured sensor readings for each active local sensor. The sensor data capture transmission when received by a server 1 can be used to create a sensor record 14 in a database, for use in creation of a chronologically and geographically referenced data set of local sensor readings in respect of monitored assets 4 associated with the sensor interface device 5. Sensor interface device 5 of this type could be used in conjunction with the server and method outlined above.

The local sensors 3 connected to the bus might be hardwired in respect of the sensor interface device 5, or other embodiments of the sensor interface device 5 could permit the infield attachment of the sensor interface device 5 to pre-existing sensors. Either such approach, with the necessary modifications if any to the software and hardware of the sensor interface device to accommodate either the use of pre-existing infield sensors or hardwired or shipped from factory sensors for use in specific conjunction with the sensor interface device of the present invention are both contemplated within the scope hereof.

The sensor software component of the sensor interface device itself could be responsible for originating sensor data capture transmissions to the server on a scheduled basis. The software could trigger the origination of a sensor data capture transmission on a predetermined time basis, or in any number of other different types of pre-programmed or predetermined frequencies or times. A sensor data capture transmission could also be originated by the sensor software component when a change in the levels or readings of the local sensors active and attached to the sensor interface device was determined. By only triggering a sensor data capture transmission when there was a sensor level change, network bandwidth consumed for the transmissions would be minimized. Any type of a locally triggered or locally scheduled sensor data capture transmission process is contemplated within the scope of the present invention.

Beyond a locally triggered or locally scheduled sensor data capture transmission process, the sensor interface device 5 might also be capable of receiving an indication of a trigger condition or a request to poll the sensors attached thereto from a server 1 via the network interface 26 and this type of a network polling behaviour is also contemplated within the scope hereof.

The method of the present invention encompasses the behaviour of the server 1 in response to the receipt of sensor data capture transmissions or sample requests from sensor interface device 5 or client devices 2. Another workflow encompassed by the method of the present invention which it is desired to briefly address is the data capture workflow of the sensor interface device 5, executed by the hardware of the sensor interface device 5 in conjunction with sensor software 23 to execute the capture of local sensor values in relation to a remote asset 4 associated therewith, and the creation and transmission thereof to a server 1 for the creation of a sensor record 14 in accordance with the remainder of the method of the present invention.

Figure 8:
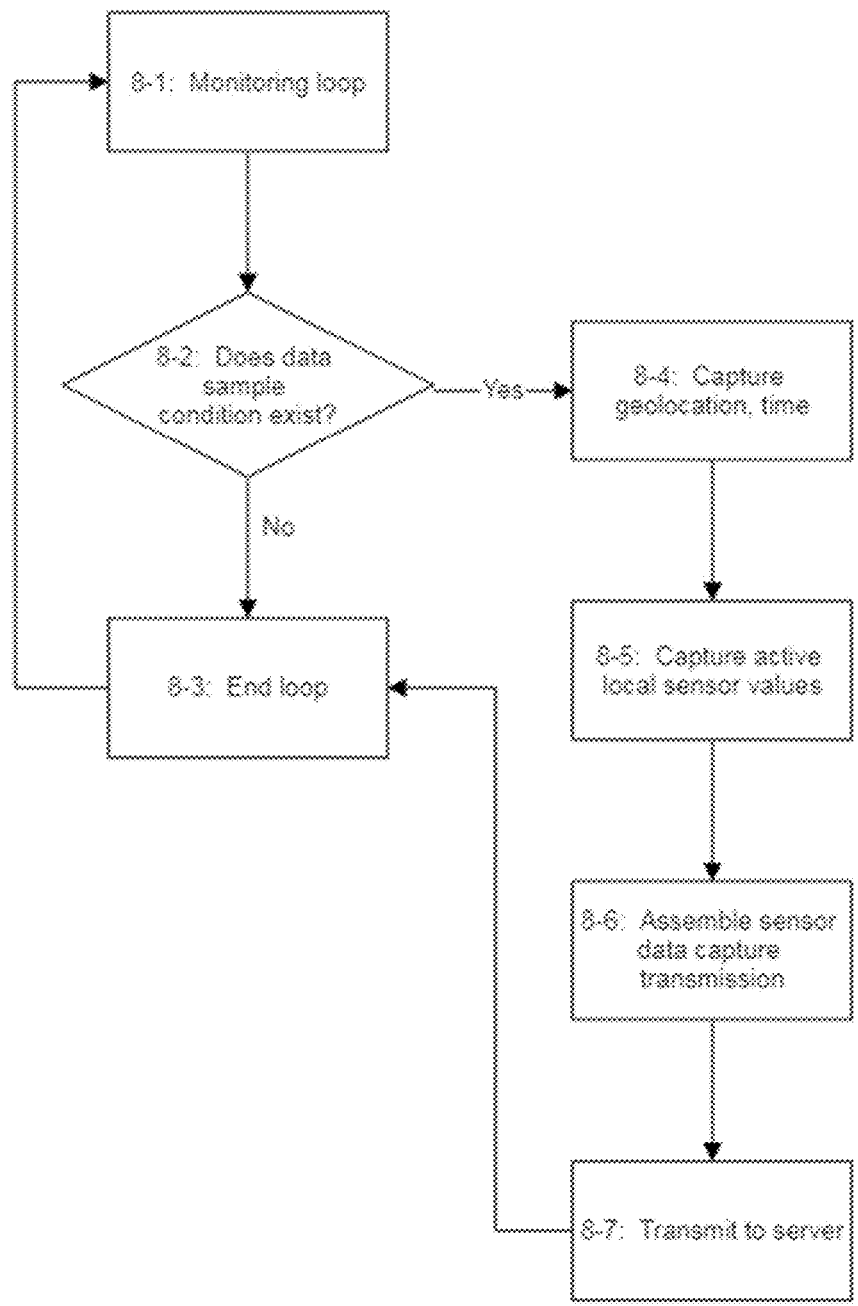
FIG. 8 is a flowchart demonstrating the steps associated with one embodiment of the conduct of a data sampling transaction by a sensor interface device in accordance with the present invention.

We refer to FIG. 8 which is a flowchart demonstrating steps associated with one particular embodiment of a data capture workflow of the sensor interface device 5 in accordance with the remainder of the present invention. The data capture workflow of FIG. 8 again is presented as a monitoring loop, in which the sensor software 23 of the sensor interface device 5 will monitor conditions to detect the existence of a data sampling condition. The data sampling condition, which would result in the capture of sensor readings and generation of a sensor data capture transmission from the sensor interface device 5 to a server 1 in accordance with the remainder of the present invention, would exist when it was determined by the software 23 that a trigger condition existed which would mandate the conduct of a data capture and sensor check of the local sensors attached to the sensor bus 25 of the sensor interface device 5. The data sampling condition or trigger condition might either constitute a manual call for a data sample to be taken initiated by a user through a client device 2 communicating with the sensor interface device 5 directly or through the server 1, a determination by the sensor software 23 of the existence of a trigger condition which might include a preprogrammed frequency or interval, a sensor value change of a particular range or the like. In the case of two-way communication between the server 1 and the sensor interface device 5, the trigger condition occasionally in the conduct of the data sampling transaction might also constitute a polling request received by the sensor interface device 5 over its network interface 26 from the server 1. Different conditions which could trigger the sampling of sensor data values for sensors attached to the sensor interface device 5 in association with a associated remote asset 4 are outlined in further detail herein and all approaches to the triggering of a data sample transaction are contemplated within the scope of the present invention.

Referring to FIG. 8 the monitoring loop, commencing at 8-1, is shown. The design of software including a loop or listener, or other similar software methodology to periodically check the network interface 26 of the sensor interface device 5 or otherwise determine the distance of the data sampling condition will be understood to those skilled in the art. Within the monitoring loop 8-1, a decision block is shown at 8-2. If in the decision block 8-2 the software 23 determines that a data sample condition exists, namely a sampling of sensor values associated with the sensor interface device 5 is triggered, then the subroutine shown from 8-4 through 8-7 is triggered.

On determination of the existence of a data sample condition, it in the decision block at 8-2, if the condition does exist such that the yes leg of the decision block is followed, the software 23 would capture the geolocation of the sensor interface device 5 via the GPS 24 or other related software and hardware components of the sensor interface device required to capture the geolocation of the device, and a timestamp of the capture time will be captured in respect of the data sampling transaction. The capture time could be captured via the processor 20 and related clock or the like of the hardware of the sensor interface device. Capturing the geolocation and the capture time is shown at step 8-4 of this workflow.

Following the capture of the geolocation and the time, the sensor interface device 5 in conjunction with sensor software 23 and the sensor bus 25 will capture the current sensor values for each active local sensor connected to the sensor bus 25. As outlined in further detail throughout, sensor bus 25 can accommodate the connection of a single sensor or more than one sensor, and the necessary adjustments to the software and other components of the sensor interface device 5 to accommodate the appropriate number of sensors for connection to the sensor bus 25 will be understood and is contemplated within the scope hereof. The sensor bus 25 will permit the capture of readable sensor values in respect of each active local sensor and in conjunction with the sensor software 23 can standardize or properly scale the captured values for storage. Capturing a snapshot of the current active local sensor values is shown at step 8-5.

Following the capture of the active local sensor values, the sensors offer 23, shown at step 8-6, will assemble a data packet or transmission, being a sensor data capture transmission, for transmission to a server 1 in communication with the sensor interface device 5. The file assembled for the sensor data capture transmission would include an identifier of the sensor interface device 5, along with the geolocation in the capture time and all of the active local sensor values captured. Following assembly of that transmission file or the necessary information, the sensor data capture transmission would be transmitted to the server 1, shown at step 8-7. On completion of a successful transmission to the server 1, the sensor capture subroutine would be completed and the monitoring loop would continue, shown at block 8-3.

It will be understood that the sensor software 23 could take many different forms, including that of the monitoring loop shown, or other architectural approaches can also be taken to be obvious to those skilled in the art of software and hardware design. Any design for the sensor software 23 and the sensor interface device 5 and related sensor bus 25 which would achieve the objective of permitting, upon triggering, the capture of active local sensor values and the transmission of same along with the geolocation and capture time, is contemplated within the scope of the present invention. The sensor interface device 5 with the related sensor software 23 and other components outlined herein capable of capturing local sensor values at a remote asset and generating a sensor data capture transmission as outlined, for use in association with the server and the remainder of the method of the present invention is intended to be covered on a freestanding basis apart from the server or the method as outlined above in addition thereto.

In terms of the data capture subroutine and functionality of the overarching method of the present invention, sensor data capture transmissions could be originated from sensor interface device 5 associated with remote assets 4 either on triggering of such data collection and transmission by the sensor interface device 5, or by a call or polling request to the sensor interface device 5 from server 1 in other embodiments.

In some embodiments, the sensor software component executed upon the sensor interface device 5 might contain the necessary software to initiate periodic sensor data capture transmissions to the server 1 on a preprogrammed time frequency, or upon the detection of any other kind of a condition at the sensor interface device 5—including for example the system may be programmed to automatically trigger a data capture transmission upon the detection of a particular change in a local sensor value. Any type of a methodology of the overarching method which allowed the software of the sensor interface device 52 periodically or manually or otherwise initiate a sensor data capture transmission to the server will all be encompassed within the scope of the present invention.

Similarly and as outlined above, where the network communication between the server 1 and the sensor interface device 5 is two way, the server 1 could initiate a request to one or more sensor interface device 5 on the network and within the system to request that those particular hardware's initiate sensor data capture transmissions. The server could initiate these polling requests again on a periodic frequency which was preprogrammed, or upon the detection of any other kind of condition, or even a manual request initiated from a client device 2 to capture a new data point from one or more remote assets 4. Again all such approaches are contemplated within the scope hereof.

In addition to the triggering format for sensor data capture transmissions in accordance with the method of the present invention, it will also be understood as detailed above that users of originating client devices 2 be used several different types of approaches to trigger a sample request to the server 1 which would result in extraction and display of relevant sensor records 14 to the originating client device 2. The details of the different types of triggering approaches including manual triggering by user intervention, prescheduled frequency or other approaches are all contemplated within the scope of the present invention.

Although the present technology has been described for illustration based on what is currently considered the most practical and preferred implementations, it is to be understood that such detail is solely for that purpose and that the technology is not limited to the disclosed implementations, but, on the contrary, should cover modifications and equivalent arrangements within the spirit and scope of the appended claims. For example, it is to be understood that the present technology contemplates that, to the extent possible, one or more features of any implementation can be combined with one or more features of any other implementation.

In addition, it will be apparent to those of skill in the art that by routine modification the present invention can be optimized for a wide range of conditions and application. It will also be obvious to those of skill in the art there are various ways and designs with which to produce the apparatus and methods of the present invention. The illustrated embodiments are therefore not intended to limit the invention, but to provide examples of the apparatus and method to enable those of skill in the art to appreciate the inventive concept.

The invention claimed is:

1. A method of monitoring local sensors associated with a plurality of remote assets, each remote asset being a monitored asset and having an associated sensor interface device associated therewith comprising a processor, memory and a wide-area network interface; a geolocation device configured to capture the geolocation of the sensor interface device; a sensor bus configured to connect to and read from at least one local sensor associated with the remote asset; a sensor software component operable on the processor configured to initiate and complete periodic sensor data capture transmissions via the network interface to a server; and a power supply that does not require external charging or power input, thus allowing for long-term remote deployment of the sensor interface device in the field; the method comprising the steps of:

a. providing a server comprising:
      i. a processor and memory;
      ii. a network interface configured to communicate via at least one wide-area data network with at least one client device of a user, as well as with the sensor interface device associated with each monitored asset;

iii. a database comprising:
   1. an asset dataset comprising an asset record corresponding to each monitored asset and its associated sensor interface device; and
   2. a sensor dataset comprising a plurality of sensor records each corresponding to a sensor data capture at a remote asset and containing a link to the related asset record, a timestamp of the time of the sensor data capture being the capture time, the geolocation of the associated sensor interface device at the capture time, and captured sensor readings for each active local sensor of the associated sensor interface device at the capture time; and
iv. a monitoring software component for carrying out the steps of the method;
b. using the monitoring software component:
   i. on receipt of a sensor data capture transmission via the network interface to the server:
      1. extracting data values including the identity of the sensor interface device, the timestamp of the capture time, the geolocation of the sensor interface device at the capture time, and the captured sensor readings for each active local sensor of the associated sensor interface device at the capture time, from the data received; and
      2. creating a sensor record containing the data values from the sensor data capture transmission and associated with the asset record of the sensor interface device identified in the transmission; and
   ii. on receipt of a sample request at the server from an originating client device in respect of a at least one monitored asset, said sample request including the identity of the at least one monitored asset and a specified sample time period:
      1. identifying the asset record corresponding to each of the at least one monitored asset which is the subject of the sample request, being the identified asset record;
      2. selecting the sensor records from the database corresponding to each identified asset record and timestamped within the sample time period, being the extracted record set; and
      3. facilitating the transmission of at least the geolocation and the captured sensor readings for each record of the extracted record set to the originating client device for display or use by a user thereof.

2. The method of claim 1 wherein the contents of the extracted record set transmitted to the originating client device in respect of a sample request are sorted in order of the timestamps thereof.

3. The method of claim 1 wherein the number of local sensors connected to the sensor bus of a sensor interface device is one.

4. The method of claim 1 wherein the number of local sensors connected to the sensor bus of a sensor interface device is more than one.

5. The method of claim 1 wherein the sensor software component of the sensor interface device initiates a periodic sampling step and a subsequent sensor data capture transmission to the server, at a predetermined frequency.

6. The method of claim 1 wherein the sensor interface device is in two-way communication with the server, and the server can poll the sensor interface device to originate a sampling step and a subsequent sensor data capture transmission to the server.

7. The method of claim 1 wherein the monitoring software component further comprises mapping software such that the transmission and display of the extracted record set to the user interface of the originating client device displays the captured sensor readings from the extracted record set visually on a map using the stored geolocations of each related sensor record.

8. The method of claim 1 wherein the local sensors are selected from the group of temperature sensors, liquid level sensors, dry level sensors, or any other type of an active or passive sensor which could be sampled by the sensor bus of the sensor interface device.

9. The method of claim 1 wherein the number of monitored assets pertaining to a sample request is one.

10. The method of claim 1 wherein the number of monitored assets pertaining to a sample request is more than one.

11. The method of claim 1 wherein the power supply of the sensor interface device comprises a battery and a solar charging system.

12. The method of claim 1 wherein the network interface of the sensor interface device is a cellular modem connected to a cellular data network.

13. A server for use in a method of monitoring local sensors associated with a plurality of monitored assets each having a sensor interface device associated therewith comprising a processor, memory and a wide-area network interface; a geolocation device configured to capture the geolocation of the sensor interface device; a sensor bus configured to connect to and read from at least one local sensor associated with the remote asset; a sensor software component operable on the processor configured to initiate and complete periodic sensor data capture transmissions via the network interface to a server; and a power supply; said server comprising:
a. a processor and memory;
b. a network interface configured to communicate via at least one wide-area data network with at least one client device of a user, as well as with a plurality of sensor interface devices each associated with a monitored asset;
b. a database comprising:
   i. an asset dataset comprising an asset record corresponding to each monitored asset and its associated sensor interface device; and
   ii. a sensor dataset comprising a plurality of sensor records each corresponding to a sensor data capture at a remote asset and containing a link to the related asset record, a timestamp of the time of the sensor data capture being the capture time, the geolocation of the associated sensor interface device at the capture time, and captured sensor readings for each active local sensor of the associated sensor interface device at the capture time; and
c. a monitoring software component for carrying out a method comprising the steps of:
   i. on receipt of a sensor data capture transmission via the network interface to the server:
      1. extracting data values including the identity of the sensor interface device, the timestamp of the capture time, the geolocation of the sensor interface device at the capture time, and the captured sensor readings for each active local sensor of the associated sensor interface device at the capture time, from the data received; and
      2. creating a sensor record containing the data values from the sensor data capture transmission and associated with the asset record of the sensor interface device identified in the transmission; and ii. on receipt of a sample request at the server from an originating client device in respect of at least one monitored asset, said sample request including the identity of the monitored asset and a specified sample time period:

1. identifying the asset record corresponding to the at least one monitored asset which is the subject of the sample request, being the identified asset record;
2. selecting the sensor records from the database corresponding to the identified asset records and timestamped within the sample time period, being the extracted record set; and
3. facilitating the display of at least the geolocation and the captured sensor readings for each record of the extracted record set on the display of the originating client device.

14. The server of claim 13 wherein the monitoring software further comprises mapping software such that the transmission and display of the extracted record set to the user interface of the originating client device displays the captured sensor readings from the extracted record set visually on a map using the stored geolocations of each related sensor record.

15. The server of claim 13 wherein the contents of the extracted record set transmitted to the originating client device in respect of a sample request are sorted in order of the timestamps thereof.

16. The server of claim 13 wherein the number of local sensors connected to the sensor bus of a sensor interface device is one.

17. The server of claim 13 wherein the number of local sensors connected to the sensor bus of a sensor interface device is more than one.

18. The server of claim 13 wherein at least one sensor interface device is in two-way communication with the server and the server can poll said sensor interface device to originate a sampling step and a subsequent sensor data capture transmission to the server.

19. The server of claim 13 wherein the monitoring software component comprises mapping software such that the display of the extracted record set to the user interface of the originating client device displays the captured sensor readings therefrom visually on a map using the stored geolocations of each related sensor record.

20. The server of claim 13 wherein the local sensors are selected from the group of temperature sensors, liquid level sensors, dry level sensors, or any other type of an active or passive sensor which could be sampled by the sensor bus of the sensor interface device.

* * * * *